United States Patent
Olliges-Stadler

(10) Patent No.: US 11,390,727 B2
(45) Date of Patent: Jul. 19, 2022

(54) FILLER PARTICLE CONTAINING FIBRES, HAVING IMPROVED ANCHORING IN A POLYTETRAFLUOROETHYLENE MATRIX

(71) Applicant: BURCKHARDT COMPRESSION AG, Winterthur (CH)

(72) Inventor: Inga Olliges-Stadler, Elsau (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 293 days.

(21) Appl. No.: 16/628,925

(22) PCT Filed: Jun. 13, 2018

(86) PCT No.: PCT/EP2018/065612
§ 371 (c)(1),
(2) Date: Jan. 6, 2020

(87) PCT Pub. No.: WO2019/007652
PCT Pub. Date: Oct. 1, 2019

(65) Prior Publication Data
US 2020/0216641 A1 Jul. 9, 2020

(30) Foreign Application Priority Data
Jul. 6, 2017 (EP) .................................. 17180042

(51) Int. Cl.
*C08K 9/10* (2006.01)
*C08K 7/02* (2006.01)
*C08L 27/18* (2006.01)

(52) U.S. Cl.
CPC ................ *C08K 9/10* (2013.01); *C08K 7/02* (2013.01); *C08L 27/18* (2013.01)

(58) Field of Classification Search
CPC ............. C08K 9/10; C08K 7/02; C08L 27/18
USPC ....................................................... 524/495
See application file for complete search history.

(56) References Cited

U.S. PATENT DOCUMENTS

| 4,026,863 A * | 5/1977 | Iseki ...................... C08K 9/08 523/205 |
| 2008/0305329 A1 | 12/2008 | Sean |
| 2013/0230563 A1 | 9/2013 | Puska et al. |

FOREIGN PATENT DOCUMENTS

| CN | 1285372 A | 2/2001 |
| EP | 2634207 B1 | 4/2014 |

OTHER PUBLICATIONS

International Search Report for PCT/EP2018/065612, Prepared by the EP Patent Office, dated Aug. 20, 2018, 6 pages.
Harsha A P et al. "Erosive wear studies of epoxy-based composites at normal incidence" Wear, Elsevier Sequoia, Lausanne, Ch, vol. 265, No. 7-8, Sep. 20, 2008 (Sep. 20, 2008), pp. 1129-1135.

* cited by examiner

*Primary Examiner* — Deve V Hall
(74) *Attorney, Agent, or Firm* — Brooks Kushman P.C.

(57) ABSTRACT

A filler particle containing fibres, in which two or more fibres are enclosed at least partially in a solid particle made of a polymer selected from the group consisting of polyphenylene sulfides, liquid-crystal polymers, polyphenylene sulfones, polyether sulfones, thermoplastic polyimides, polyamide-imides, epoxy resins, perfluoroalkoxy polymers and any mixtures of two or more of the abovementioned polymers, wherein the end opposite the end enclosed in the solid particle of at least some fibres protrudes out of the solid particle. The fibres having a maximum length of 1000 μm and a maximum thickness of 100 μm. Such fibres can be obtained by mixing the polymer with fibres, by melting the polymer and/or chemical reaction of the polymer components, by cooling the mixture of molten polymer and fibres to give a solid fibre-polymer composite and by comminution of the fibre-polymer composite to give filler particles containing fibres a maximum length of 1000 μm.

26 Claims, 1 Drawing Sheet

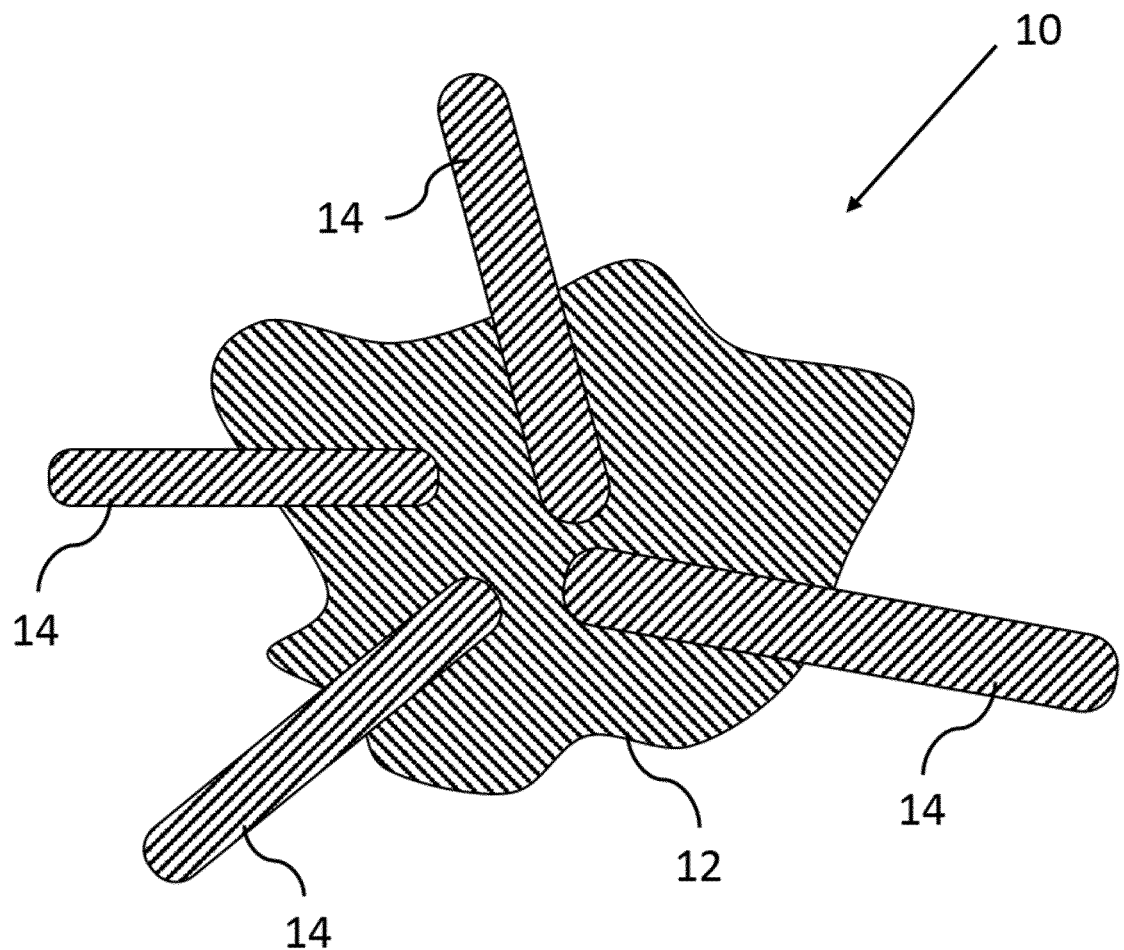

FILLER PARTICLE CONTAINING FIBRES, HAVING IMPROVED ANCHORING IN A POLYTETRAFLUOROETHYLENE MATRIX

CROSS-REFERENCE TO RELATED APPLICATION

This application is the U.S. national phase of PCT Application No. PCT/EP2018/065612 filed on Jun. 13, 2018, which claims priority to EP Patent Application No. 17180042.8 filed on Jul. 6, 2017, the disclosures of which are incorporated in their entirety by reference herein.

The present invention relates to a fiber-containing filler particle, a composite material comprising a matrix composed of polytetrafluoroethylene with these fiber-containing filler particles being dispersed in the matrix, and also a process for producing such fiber-containing filler particles.

Polytetrafluoroethylene (PTFE) displays an extraordinarily wide thermal use range, is virtually universally chemically resistant and has excellent resistance to light, weathering and hot steam. In addition, PTFE displays very good sliding properties, an excellent nonstick behavior, good electrical properties and good dielectric properties, for which reasons PTFE is sought after for many applications and in particular as sealing material. However, PTFE has a comparatively low mechanical stability and comparably poor creep properties and cold flow properties, so that for many applications PTFE cannot be used in pure form but is instead reinforced with fillers by dispersing inorganic filler, organic filler and/or fibers in a PTFE matrix. Examples of suitable fillers and fibers are glass fibers, carbon powder, graphite and carbon fibers. Here, the addition of the filler(s) leads to an improvement in the mechanical properties of the composite material.

However, PTFE displays a low degree of adhesion to other materials not only on its surface but also to most fillers of commercial interest, in particular to polymer fillers. This can even lead to the wear properties of compositions comprising PTFE and filler being worse than those of unfilled PTFE. The addition of bonding agents in such composite materials has been proposed in order to improve the adhesion of fillers to PTFE. However, such bonding agents can lead to undesirable reactions and cannot be used in some applications, in particular in the presence of oxygen.

Proceeding therefrom, it is an object of the present invention to provide a polymer filler for PTFE which displays improved adhesion to PTFE.

This object is achieved according to the invention by a fiber-containing filler particle in which two or more fibers are at least partly enclosed in a solid particle comprising a polymer selected from the group consisting of polyphenylene sulfides, liquid-crystalline polymers, polyphenylene sulfones, polyether sulfones, thermoplastic polyimides, polyamidimides, epoxy resins, perfluoroalkoxy polymers and any mixtures of two or more of the abovementioned polymers, wherein the end of at least part of the fibers opposite the end enclosed in the solid particle projects from the solid particle and the fiber-containing filler particle has a maximum longitudinal dimension of 1000 μm and the fibers have a thickness of not more than 100 μm.

This solution is based on the surprising recognition that partial inclusion of fibers which have a thickness which is not too great in a particle comprising a polymer selected from the group consisting of polyphenylene sulfides, liquid-crystalline polymers, polyphenylene sulfones, polyether sulfones, thermoplastic polyimides, polyamidimides, epoxy resins, perfluoroalkoxy polymers and any mixtures of two or more of the abovementioned polymers in such a way that the end of at least part of the fibers opposite the end enclosed in the solid particle projects from the solid particle enables the adhesion of the polymer particle to PTFE to be considerably improved. This is achieved by the fiber ends projecting from the polymer particle, which in principle serve as physical bonding agents, because they mechanically anchor the polymer particle in the PTFE matrix. In principle, the filler particle according to the invention has a hedgehog-like structure in which many fiber ends project from the polymer particle at the surface, which leads to a correspondingly rough surface of the particle which improves adhesion. Here, the fibers bind more strongly to the polymer filler in which they are partially enclosed than to the PTFE, so that detachment of the fibers from the polymer filler is reliably prevented.

According to the invention, polyphenylene sulfide, liquid-crystalline polymer, polyphenylene sulfones, polyether sulfones, thermoplastic polyimides, polyamidimides, epoxy resins, perfluoroalkoxy polymer or a mixture thereof is used as polymer for the solid particle. Good results are achieved, in particular, when using solid particles which contain polyphenylene sulfide as polymer. Polyphenylene sulfide also withstands high sintering temperatures of more than 360° C. which are frequently used for producing PTFE components. In addition, polyphenylene sulfide as filler improves the creep properties and cold flow properties of PTFE.

In a particularly preferred embodiment of the present invention, the solid particle contains crosslinked polyphenylene sulfide as polymer. This material displays thermoset behavior and no longer melts, for which reason it is particularly robust and binds the partially enclosed fibers particularly strongly.

In order to achieve the adhesion-promoting effect of the fibers projecting from the particle to a particularly great extent, it is proposed in further developments of the inventive concept that more than 2, preferably more than 5 and particularly preferably more than 10, fibers be partially enclosed in the fiber-containing filler particle.

As regards the chemical nature of the fibers, the present invention is not subject to any particular limitations. In particular, the fibers can be selected from the group consisting of carbon fibers, glass fibers, polymer fibers, ceramic fibers, metal fibers and any mixtures of two or more of the abovementioned types of fibers. Good results are achieved, in particular, when using carbon fibers which are not only chemically stable but also display a particularly high tensile strength.

To be able to bind the fibers satisfactorily in the filler polymer particle, the fibers are preferably not too thick. Good results are obtained, in particular, when using fibers having a thickness of from 1 to 100 μm. The fibers more preferably have a thickness of from 2 to 75 μm, particularly preferably from 5 to 50 μm and very particularly preferably from 6 to 20 μm.

In order to achieve the adhesion-promoting effect of the fibers projecting from the particle to a particularly great extent, it is proposed in a further, particularly preferred embodiment of the present invention that the end of at least part of the fibers opposite the end enclosed in the solid particle projects by from 1 to 100 μm and preferably by from 10 to 50 μm from the solid particle. If the projecting end is too short, the anchoring effect achieved thereby is too low. When the projecting end exceeds a particular length, the increasing length no longer contributes to an improvement in adhesion but leads to unnecessarily increased materials costs because of the increased amount of fiber material, particularly in the case of carbon fibers.

Likewise, in order to achieve the adhesion-promoting effect of the fibers projecting from the particle to a particularly high degree, preference is given to the end of at least 2, more preferably at least 5 and particularly preferably at least 10, fibers opposite the end enclosed in the solid particle projecting from the solid particle.

In addition, the fiber-containing filler particle preferably has a maximum length of from 1 to 1000 µm, preferably from 5 to 500 µm and particularly preferably from 10 to 200 µm. This makes good dispersion in the PTFE material possible.

As regards the particle shape of the filler particle, the present invention is not subject to any particular limitations. Thus, the filler particle can be spherical, ellipsoidal, cylindrical or irregular in shape. Particularly good results are achieved, in particular, using irregularly shaped filler particles.

The present invention further provides a composite material comprising a matrix composed of polytetrafluoroethylene, wherein the composite material contains the above-described fiber-containing filler particles in the matrix.

The composite material can contain, for example, from 40 to 90% by weight and in particular from 50 to 70% by weight of PTFE and/or modified PTFE, from 5 to 50% by weight and in particular from 10 to 40% by weight of the above-described fiber-containing filler particles and from 0 to 10% by weight and in particular from 1 to 5% by weight of inorganic, nonfibrous fillers such as graphite, carbon, molybdenum disulfide, ceramic powder or metals, where the sum of the components is naturally 100% by weight.

In addition, the present invention provides a process for producing the above-described fiber-containing filler particles. According to the invention, the process comprises the following steps:

a) mixing of fibers having a thickness of not more than 100 µm with a polymer selected from the group consisting of polyphenylene sulfides, liquid-crystalline polymers, polyphenylene sulfones, polyether sulfones, thermoplastic polyimides, polyamidimides, epoxy resins, perfluoroalkoxy polymers and any mixtures of two or more of the abovementioned polymers, where the fibers have a higher melting point than the polymer, to give a fiber-polymer mixture, b1) melting of the fiber-polymer mixture obtained in step a) at a temperature which is above the melting point of the polymer but below the melting point of the fibers to give a fiber-melt mixture, or b2) curing of the polymer components of the fiber-polymer mixture obtained in step a) by chemical reaction to give a fiber-polymer composite, c) optionally cooling of the fiber-polymer composite obtained in step b1) or b2), and d) comminution of the fiber-polymer composite obtained in step c) to give fiber-containing filler particles having a maximum length of 1000 µm.

Preference is given to using a polyphenylene sulfide as polymer in step a) and carrying out process steps b1), c) and d) under an air atmosphere, so that the polyphenylene sulfide crosslinks. If an epoxy resin is used as polymer in step a), this crosslinks in step b2) by chemical reaction of the epoxy groups with the hardener added in step a). Depending on the type of hardener, crosslinking takes place at room temperature, in which case step c) is omitted, or hot at temperatures in the range from 50 to 200° C.

In a further development of the inventive concept, it is proposed that the fiber-polymer composite be comminuted in step d) to give fiber-containing filler particles having a maximum length of from 1 to 1000 µm, preferably from 5 to 500 µm and particularly preferably from 10 to 200 µm.

The comminution of the fiber-polymer composite in step c) is preferably carried out by milling or crushing. During crushing, the fibers are damaged to a lesser extent than during milling, for which reason comminution of the fiber-polymer composite in step d) by crushing is particularly preferred. Crushing of the fiber-polymer composite preferably results in the filler particles produced thereby having individually different particle shapes and the filler particles thus being irregularly, individually differently shaped.

The present invention further provides fiber-containing filler particles which are obtainable by the above-described process.

The present invention will be described below with the aid of a FIGURE which illustrates but which does not restrict the invention.

Here, the single

FIGURE schematically shows a cross section of a fiber-containing filler particle according to an embodiment of the present invention.

The fiber-containing filler particle 10 shown in cross section in the FIGURE is irregularly shaped, for example essentially spherically shaped, and consists of a polyphenylene sulfide particle 12 in which a plurality of carbon fibers 14 are partly enclosed. The end of all carbon fibers 14 opposite the end enclosed in the polyphenylene sulfide particle 12 projects from the polyphenylene sulfide particle 12. The fiber-containing filler particle 10 therefore has an essentially hedgehog-like structure in which a plurality of fiber ends project from the polymer particle 12 at the surface, which leads to a correspondingly rough surface of the particle 10 which improves adhesion to PTFE.

The present invention is described below with the aid of a working example which illustrates but does not restrict the invention.

EXAMPLE 800 g of pulverulent polyphenylene sulfide were mixed with 400 g of carbon fibers having a fiber length of 150 µm and a fiber diameter of 15 µm and the resulting mixture was distributed on a metal sheet. The mixture on the metal sheet was subsequently heated at 300° C. for 6 hours in order to melt the polyphenylene sulfide which had a melting point of 285° C. The mixture was subsequently cooled and the solidified fiber-containing polymer melt was comminuted by means of, for example, a high-performance mixer comprising a beater device, blades or knives or, for example, by means of a mill to give fiber-containing filler particles having an average diameter of 50 µm.

The following mixture was subsequently produced:
63% by weight of PTFE,
35% by weight of the above-described polyphenylene sulfide particles containing carbon fibers and
2% by weight of graphite.

The mixture was then processed at 370° C. for 3 hours to give a composite material and then cooled to room temperature. The composite material produced in this way displayed excellent adhesion of the polyphenylene sulfide particles containing carbon fibers to PTFE.

The invention claimed is:
1. A fiber-containing filler particle in which two or more fibers are at least partly enclosed in a solid particle com- prising a polymer selected from the group consisting of polyphenylene sulfides, liquid-crystalline polymers, polyphenylene sulfones, polyether sulfones, thermoplastic polyimides, polyamidimides, epoxy resins, perfluoroalkoxy polymers and any mixtures of two or more of the abovementioned polymers, wherein the end of at least part of the fibers opposite the end enclosed in the solid particle projects from the solid particle and the fiber-containing filler particle has a maximum longitudinal dimension of 1000 µm and the fibers have a thickness of not more than 100 µm.

2. The fiber-containing filler particle as claimed in claim 1, wherein the solid particle contains polyphenylene sulfide as polymer.

3. The fiber-containing filler particle as claimed in claim 2, wherein the solid particle contains crosslinked polyphenylene sulfide as polymer.

4. The fiber-containing filler particle as claimed in claim 1, wherein more than 2 fibers are partly enclosed therein.

5. The fiber-containing filler particle as claimed in claim 1, wherein the fibers are selected from the group consisting of carbon fibers, glass fibers, polymer fibers, ceramic fibers, metal fibers and any mixtures of two or more of the abovementioned fibers.

6. The fiber-containing filler particle as claimed in claim 1, wherein the fibers are carbon fibers.

7. The fiber-containing filler particle as claimed in claim 1, wherein the fibers have a thickness of from 1 to 100 µm.

8. The fiber-containing filler particle as claimed claim 1, wherein the end of at least part of the fibers opposite the end enclosed in the solid particle projects from 1 to 100 µm from the solid particle.

9. The fiber-containing filler particle as claimed in claim 1, wherein the end of at least 2, fibers opposite the end enclosed in the solid particle projects from the solid particle.

10. The fiber-containing filler particle as claimed in claim 1, wherein the fiber-containing filler particle has a maximum length of from 1 to 1000 µm.

11. A composite material comprising a matrix composed of polytetrafluoroethylene, wherein the composite material contains fiber-containing filler particles, wherein the fiber-containing filler particles comprise two or more fibers which are at least partly enclosed in a solid particle comprising a polymer selected from the group consisting of polyphenylene sulfides, liquid-crystalline polymers, polyphenylene sulfones, polyether sulfones, thermoplastic polyimides, polyamidimides, epoxy resins, perfluoroalkoxy polymers and any mixtures of two or more of the abovementioned polymers, wherein the end of at least part of the fibers opposite the end enclosed in the solid particle projects from the solid particle and the fiber-containing filler particle has a maximum longitudinal dimension of 1000 µm and the fibers has a thickness of not more than 100 µm.

12. A process for producing fiber-containing filler particles as claimed in claim 1, which comprises the following steps:
   a) mixing of fibers having a thickness of not more than 100 µm with a polymer selected from the group consisting of polyphenylene sulfides, liquid-crystalline polymers, polyphenylene sulfones, polyether sulfones, thermoplastic polyimides, polyamidimides, epoxy resins, perfluoroalkoxy polymers and any mixtures of two or more of the abovementioned polymers, where the fibers have a higher melting point than the polymer, to give a fiber-polymer mixture,
   b1) melting of the fiber-polymer mixture obtained in step a) at a temperature which is above the melting point of the polymer but below the melting point of the fibers to give a fiber-melt mixture, or
   b2) curing of the polymer components of the fiber-polymer mixture obtained in step a) by chemical reaction to give a fiber-polymer composite,
   c) optionally cooling of the fiber-polymer composite obtained in step b1) or b2), and
   d) comminution of the fiber-polymer composite obtained in step c) to give fiber-containing filler particles having a maximum length of 1000 µm.

13. The process as claimed in claim 12, wherein a polyphenylene sulfide is used as polymer in step a) and process steps b1), c) and d) are carried out under an air atmosphere so that the polyphenylene sulfide crosslinks.

14. The process as claimed in claim 12, wherein the fiber-polymer composite is comminuted in step c) to give fiber-containing filler particles having a maximum longitudinal dimension of from 1 to 1000 µm.

15. The process as claimed in claim 12, wherein comminution of the fiber-polymer composite in step c) is carried out by milling or by crushing.

16. The fiber-containing filler particle as claimed in claim 1, wherein more than 10 fibers are partly enclosed therein.

17. The fiber-containing filler particle as claimed in claim 1, wherein the fibers have a thickness of from 6 to 20 µm.

18. The fiber-containing filler particle as claimed claim 1, wherein the end of at least part of the fibers opposite the end enclosed in the solid particle projects from 10 to 50 µm from the solid particle.

19. The fiber-containing filler particle as claimed in claim 1, wherein the fiber-containing filler particle has a maximum length of from 10 to 200 µm.

20. The process as claimed in claim 12, wherein the fiber-polymer composite is comminuted in step c) to give fiber-containing filler particles having a maximum longitudinal dimension of from 5 to 500 µm.

21. The composite material as claimed in claim 11, wherein the solid particle contains polyphenylene sulfide as polymer.

22. The composite material as claimed in claim 21, wherein the solid particle contains crosslinked polyphenylene sulfide as polymer.

23. The composite material as claimed in claim 11, wherein more than 2 fibers are partly enclosed therein.

24. The composite material as claimed claim 11, wherein the end of at least part of the fibers opposite the end enclosed in the solid particle projects from 1 to 100 µm from the solid particle.

25. The composite material as claimed in claim 11, wherein the end of at least 2 fibers opposite the end enclosed in the solid particle projects from the solid particle.

26. The composite material as claimed claim 11, wherein the end of at least part of the fibers opposite the end enclosed in the solid particle projects from 10 to 50 µm from the solid particle.

* * * * *